United States Patent [19]

Smith et al.

[11] 3,882,563
[45] May 13, 1975

[54] HOLD-DOWN DEVICE FOR DOCKBOARD

[75] Inventors: Vernon O. Smith, Ashley; George E. Mossbarger, Marion, both of Ohio

[73] Assignee: Overhead Door Corporation, Dallas, Tex.

[22] Filed: Sept. 6, 1973

[21] Appl. No.: 394,736

[52] U.S. Cl. ................................................ 14/71
[51] Int. Cl. ............................................. B65g 11/00
[58] Field of Search ......................................... 14/71

[56] References Cited
UNITED STATES PATENTS

| | | | |
|---|---|---|---|
| 2,974,336 | 3/1961 | Kelley | 14/71 |
| 3,071,790 | 1/1963 | Le Clear | 14/71 |
| 3,117,332 | 1/1964 | Kelley et al. | 14/71 |
| 3,167,796 | 2/1965 | Layne | 14/71 |
| 3,203,019 | 8/1965 | Le Clear | 14/71 |
| 3,235,896 | 2/1966 | Riggs | 14/71 |
| 3,249,956 | 5/1966 | Zajac et al. | 14/71 |
| 3,271,801 | 9/1966 | Dieter et al. | 14/71 |
| 3,579,696 | 5/1971 | Hecker et al. | 14/71 |
| 3,646,627 | 5/1972 | Potter | 14/71 |
| 3,699,601 | 10/1972 | Hecker et al. | 14/71 |

*Primary Examiner*—Roy D. Frazier
*Assistant Examiner*—Thomas J. Holko
*Attorney, Agent, or Firm*—Woodhams, Blanchard and Flynn

[57] ABSTRACT

A dock leveler having a swingable ramp positioned for engagement with a truck bed. The front end of the ramp is normally urged upwardly by a spring-urged lift arm mounted within a pit in the dock. The ramp is movable through a selected angle, both above and below a horizontal position, to accommodate different truck bed heights and to adjust to variations therein. A hold-down mechanism coacts between the frame and the lift arm for normally preventing the lift arm from urging the upward movement of said ramp while permitting downward movement thereof. The ramp is free of positive connection to the lift arm and can thus be swung upwardly, such as due to the normal raising of a truck bed when a load is removed therefrom.

16 Claims, 6 Drawing Figures

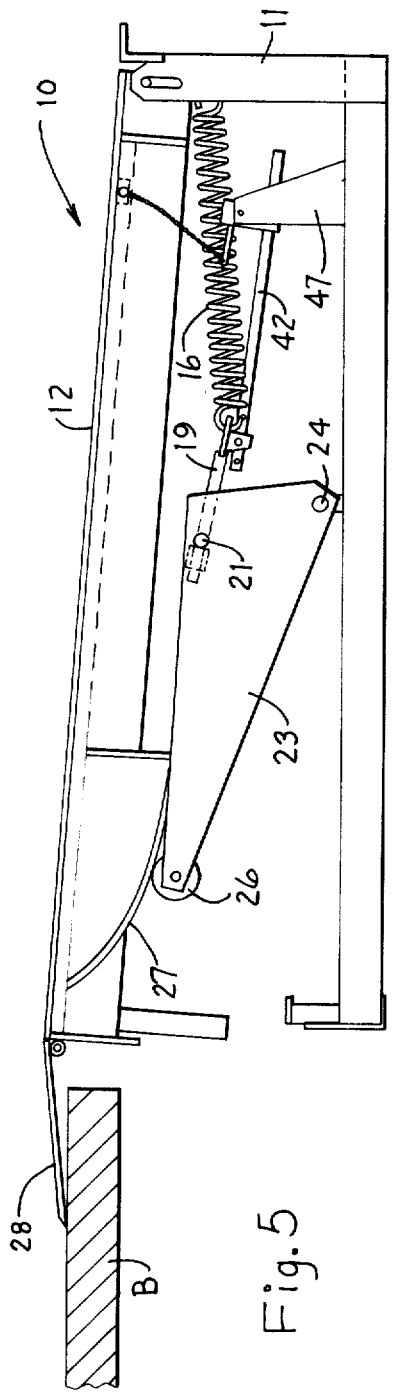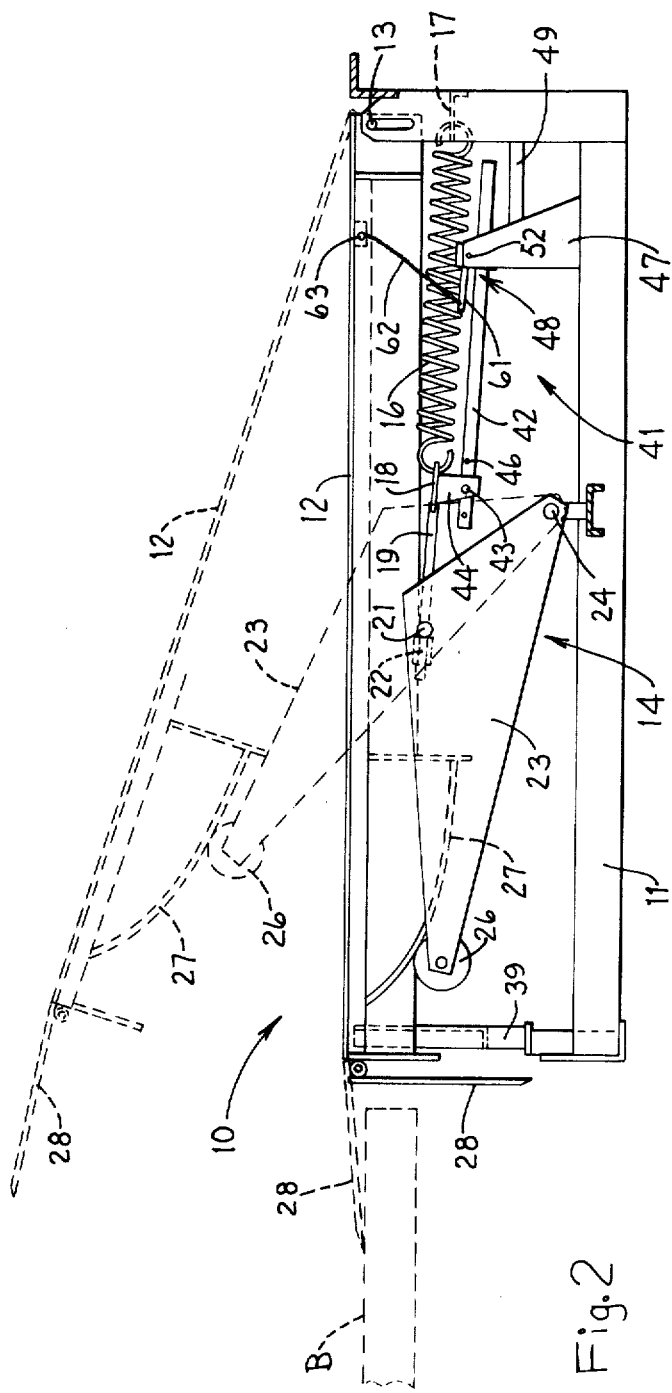

3,882,563

HOLD-DOWN DEVICE FOR DOCKBOARD

FIELD OF THE INVENTION

This invention relates to a dock leveler and, more particularly, to an improved hold-down device connected between the leveler frame and the ramp lift arm for maintaining a ramp in a substantially selected position while permitting said ramp to swing to compensate for changes in the elevation of the truck bed due to loading or unloading of the truck.

BACKGROUND OF THE INVENTION

Most dock levelers or dockboards are installed in a pit formed in a dock. The leveler includes a ramp or deck hinged at its rear edge to a frame and an extension lip hinged to the front edge of the ramp. Due to the weight of the ramp, a spring-urged lift arm is employed to bias the ramp upwardly to an inclined lift arm is employed to bias the ramp upwardly to an inclined position, while a releasable hold-down mechanism normally connects the frame with the ramp and thereby holds the ramp against upward movement. When not in use, the ramp is held by a hold-down mechanism in a cross-traffic position in which the ramp is generally flush with the upper surface of the dock. Before a truck or other carrier is moved up to the dock, the operator manually releases the hold-down mechanism so that the lift arm pivots the ramp upwardly to an inclined position. As a consequence of the upward pivotal movement of the ramp, a lip lifting mechanism is actuated to pivot the lip upwardly and outwardly to an extended position. The operator then walks outwardly on the inclined ramp and his weight overcomes the upward force of the lift arm to lower the ramp and move the lip into engagement with the bed of the carrier. This conventional hold-down mechanism is arranged so that the ramp can be moved downwardly without restraint, yet the hold-down mechanism, when engaged, will prevent upward movement of the ramp or, in the alternative, will permit upward movement of the ramp through only a limited extent as permitted by the compression of a spring associated therewith.

Many of the presently utilized hold-down mechanisms have a compression spring associated therewith for permitting limited upward movement of the ramp of deck in response to raising of the carrier bed as the load is removed therefrom. These devices are normally connected directly between the frame and the ramp and thus necessarily require an extra strong spring mechanism able to withstand the force applied to the ramp by the lift arm which is continuously urging the ramp upwardly. The compression spring associated with the hold-down mechanism must thus be extremely stiff and strong, thereby necessitating a hold-down mechanism which is both bulky and mechanically complex.

Accordingly, it is an object of the present invention to provide an improved hold-down device for a dock leveler which permits the deck to raise when the bed of a carrier raises, when the load is removed from the truck, which hold-down device permits raising of the deck without requiring the use of heavy extension or compression springs.

A further object of the present invention is to provide an improved hold-down device, as aforesaid, which is connected between the frame and the lift arm mechanism to retrain the lift arm mechanism, rather than the deck, while at the same time permitting relative bending or pivoting of the components associated with the lift arm mechanism during the raising of the deck by the carrier bed.

Still a further object of the present invention is to provide an improved hold-down mechanism, as aforesaid, which is relatively inexpensive to fabricate, which is durable, and which is effective in maintaining the deck at selected positions including a substantially horizontal position.

SUMMARY OF THE INVENTION

The objects and purposes of the present invention are met by providing a dock leveler having a deck vertically swingably mounted on a base which is adapted to be positioned within a pit. A spring-type lifting mechanism coacts between the base and the deck for normally urging same upwardly. The lifting mechanism includes a lifting arm pivotally mounted on the base and coacting with the deck, and a spring linkage connected between the lifting arm and the base for urging the lifting arm upwardly. A lip plate is hingedly mounted on the front edge of the deck and is adapted for engagement with the bed of a carrier or truck.

A hold-down mechanism is connected between the base and the lifting mechanism for restricting upward movement of the deck and for maintaining same in a substantially horizontal cross-traffic position. The hold-down mechanism includes a one-way latch which permits downward swinging of the deck, whereas the latch engages to resist upward movement of the lifting device, thereby holding the deck in the desired position. The hold-down mechanism, by the deck in the desired position. The hold-down mechanism, by being connected to the lifting mechanism, enables the deck to move upwardly when same is engaged with the bed of a carrier, as when the load is removed from the carrier bed. The hold-down mechanism is pivotally connected to the spring linkage and causes relative pivoting or flexing of the spring linkage when the deck is moved upwardly by the carrier bed so as to enable the lifting arm to follow the carrier bed, while at the likewise move upwardly and follow the carrier bed, while at the same time maintaining the springs of the lift mechanism under load. Since the hold-down mechanism is free of springs, the position of the deck when the dock leveler is not being utilized can be precisely controlled. Also, the deck is urged upwardly only by the springs associated with the lifting mechanism.

Other objects and purposes of the present invention will be apparent to persons familiar with devices of this type upon reading the following specification and inspecting the accompanying drawings.

BRIEF DESCRIPTION OF THE DRAWINGS

FIG. 2 is a side elevational view of the dock leveler illustrating same in the horizontal, cross-traffic position.

FIG. 5 is a side elevational view similar to FIG. 2 and illustrating the leveler in an operative position wherein the lip thereof is engaged with the bed of a carrier.

For convenience of reference in the following description, the words "right," "left," "up," "down," "front" and "rear" will refer to the dockboard and parts thereof as appearing in FIG. 1. The words "in" and "out" will refer to the geometric center of the dockboard structure and designated parts thereof. Said terminology will include derivatives of such words and those having a similar import.

DETAILED DESCRIPTION

Figure 1:
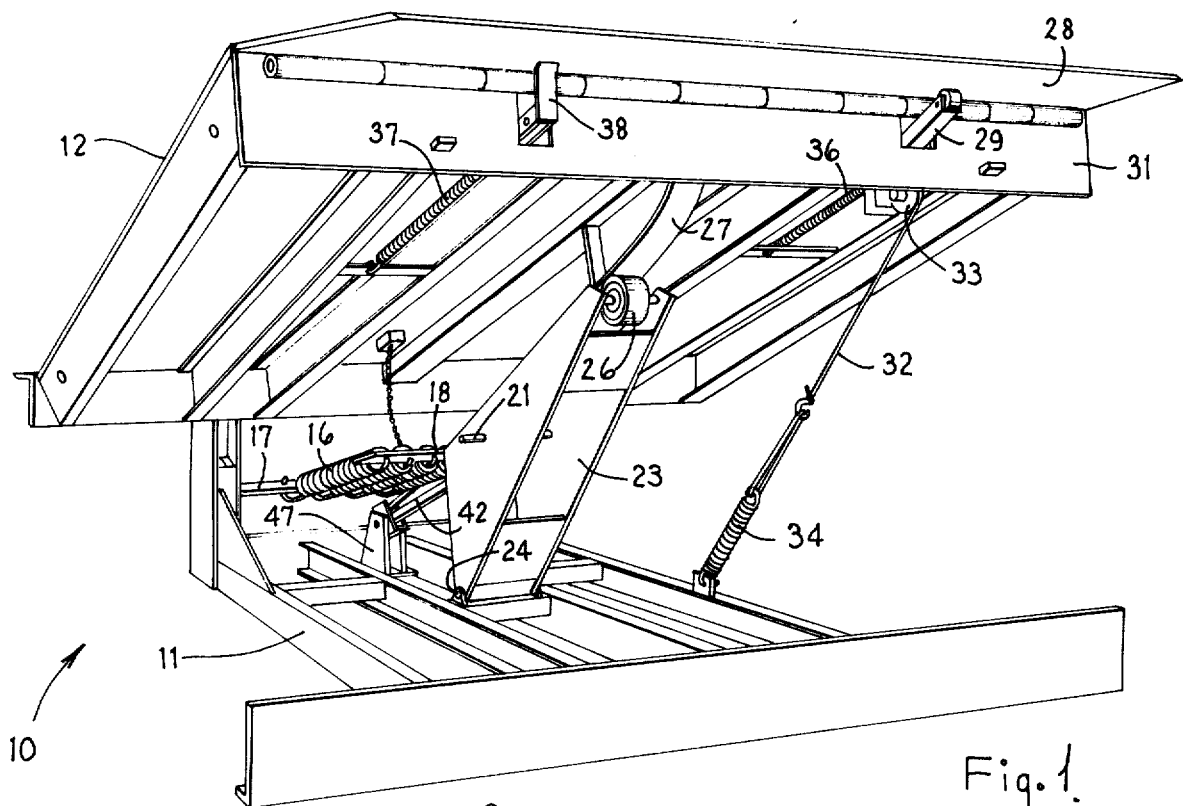
FIG. 1 is a perspective view of a dock leveler illustrated in its raised position, and showing the improved hold-down mechanism of the present invention.

FIGS. 1 and 2 illustrate therein a pit-type dock leveler or dockboard 10 consisting of a rigid base or frame 11 and a ramp or deck 12 which, adjacent its rear edge, is pivotally mounted on the base 11 by means of hinge pins 13. When in a stored or inactive position, the deck 12 is normally maintained in a substantially horizontal position wherein it is substantially flush with the surrounding loading dock, this stored horizontal position corresponding substantially to the position illustrated by solid lines in FIG. 2. The dock leveler is provided with a conventional releasable lock mechanism (not shown) for locking the deck in this stored position. When the lock mechanism is released, then the deck 12 is normally urged upwardly by means of a lift arm mechanism 14 so that the deck section assumes an upwardly inclined position substantially as illustrated by dotted lines in FIG. 2.

The lift arm mehcanism 14, as illustrated in FIG. 2, includes a plurality of extension springs 16 which have their rearward ends connected to a frame or base member 17. The forward ends of the springs 16 are in turn connected to a plate 18 which is fixedly secured to the rearward and of an ajustment rod 19, the connection between the plate 18 and the forward ends of the spirngs 16 effectively functioning as a pivotal connection. The forward end of the adjustment rod 19 is connected to a hinge rod 21 by means of an adjustment nut 22 which enables the effective length of rod 19 to be varied so as to vary the initial tension of the springs 16. The hinge rod 21 is in turn hingedly connected to an elongated lifting arm 23 which is pivoted by pins 24 to the base 11. The free end of lifting in rolling engagement with a cam 27 affixed to the underside of the deck 12. The lifting arm mechanism 14 thus resiliently urges the deck 12 to swing upwardly (clockwise in FIG. 2) so that the deck assumes an uppermost raised position substantially as illustrated by dotted lines in FIG. 2. The force generated by the spring-urged lift arm mechanism 14 is sufficient to sustain the deck 12 in its upper raised position, but is not sufficient to sustain a 150 pound weight positioned on the deck section adjacent the forward edge thereof. Thus, the deck 12 may be walked down from its raised position into a lower position, such as by a man of approximately 150 pounds walking on the deck 12 from the rear to the front thereof so as to overcome the force generated by these springs 16.

The dock leveler, in a conventional fashion, is also provided with a lip plate 28 hinged to the forward edge to the deck 12, which lip plate normally hangs downwardly in a pendent gravity position, substantially as illustrated by solid lines in FIG. 2. The lip plate 28 is actuated to swing outwardly into an extended position when the deck or ramp 12 swings upwardly and approaches its upper position. The upward swinging movement of lip plate 28 is caused by means of a rollered slide bar 29 which slides forward in a housing 31 affixed to the undercarriage of the deck section 12. The slide bar 29 is urged forwardly by means of a cable 32 which extends over a pulley 33 and is attached to the rearward end of the slide bar 29. The other end of cable 32 is connected to an extension spring 34 which is affixed to the base 11. As deck 12 is rapidly raised, the cable 32 becomes taut, extending spring 34 which urges the slide bar 29 to push lip plate 28 outwardly and upwardly to its open position and sustain it there. As the dock leveler is walked down, lip 28 remains outwardly, resting by its own weight on the slide bar. To retract the slide bar 29, an extension spring 36 is affixed between the slide bar 29 and has its others ends anchored to the undercarriage of the deck 12. However, as the deck is walked down, the friction between the lip plate 28 and the slide bar 29 prevents the slide bar from moving rearwardly until the lip plate 28 makes contact with the carrier bed, whereupon the frictional resistance is released so that spring 36 then retracts the slide bar 29 into the housing 31.

The swinging movement of the lip plate 28 is further assisted by means of a counterbalance mechanism which, as illustrated in FIG. 1, comprises a compression spring 37 which has its rearward end affixed to the deck section and its forward end affixed to a counter balance arm 38, which arm is affixed to and projects downwardly from the lower side of the lip plate 28. The compression spring 37 partially counterbalances the weight of the lip plate 28 so that the slide bar 29 can thus function to easily swing the lip plate outwardly and upwardly.

The structure of the dock leveler, as briefly described above, is substantially conventional and further description of same is thus not believed necessary. Reference is made to U.S. Pat. No. 3,235,896, issued Feb. 22, 1966, to W. O. Riggs, wherein much of the abovementioned structured is described in detail.

The dock leveler of the present invention is also provided with deck support legs 39 pivotally connected to the deck 12 adjacent the front corners thereof, which legs are adapted for engaging the base when the deck is maintained in a storage position. The legs 39 swing backwardly away from the base when the deck is being used in association with the bed of a carrier. The structure of these legs, and their mode of operation, will not be described in detail since the use of support legs is conventional.

According to the present invention, the dock leveler 10 is provided with an improved hold-down device 41 which, as illustrated in FIG. 2, is connected between the base 11 and the lift arm mechanism 14. The hold-down device 41 includes an elongated slide bar 42 which, in the illustrated embodiment, is of substantially rectangular cross-section and is pivoted adjacent its forward end by means of a pin 43 to a clevis 44. The clevis 44 is fixedly secured to and projects downwardly from the plate 18. The forward end of the slide bar 42 is provided with a plurality of spaced holes 46 therethrough, and the pivot pin 43 extends through one of these holes 46 for a purpose to be explained hereinafter.

Figures 3, 4:
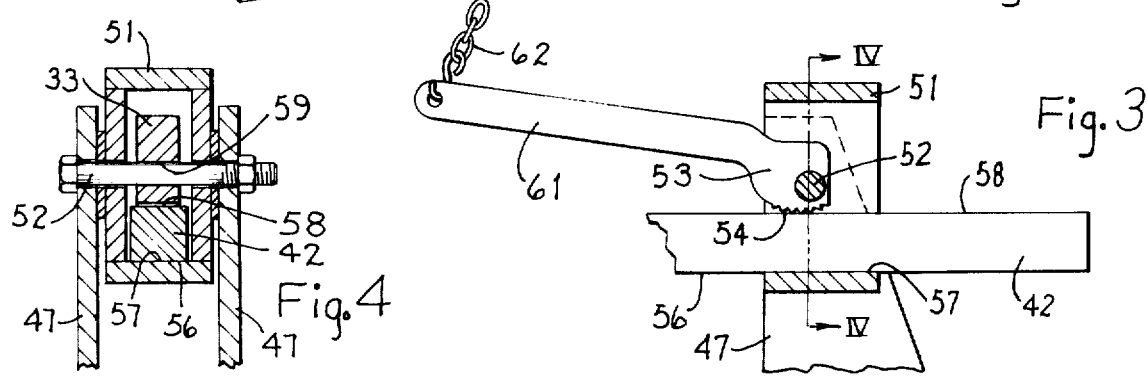
FIG. 3 is an enlarged fragmentary view of a portion of the improved hold-down mechanism of the present invention.
FIG. 4 is a fragmentary sectional view taken substantially along the line IV—IV in FIG. 3.
Figure 6:
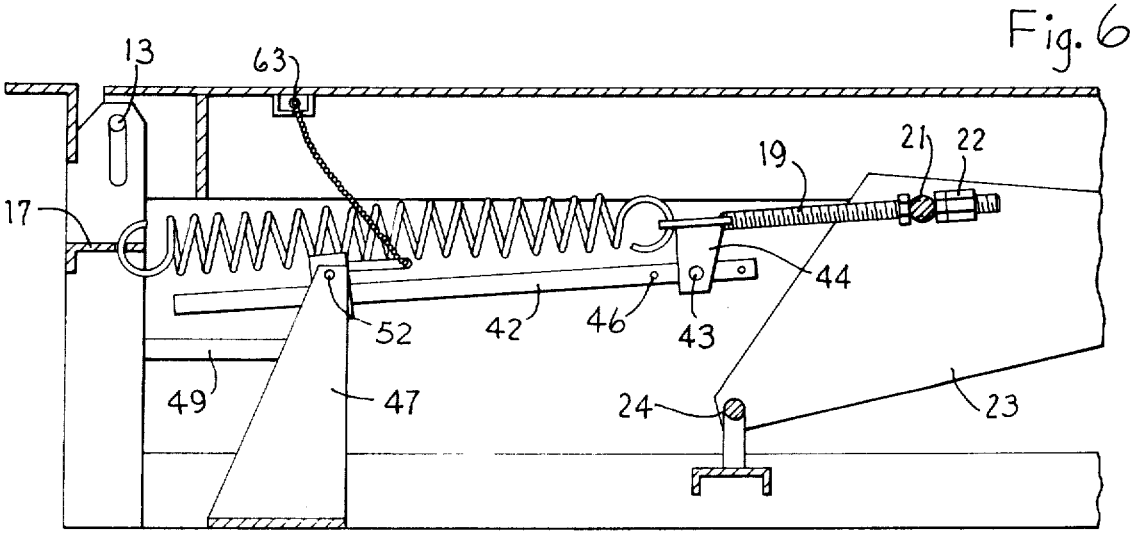
FIG. 6 is an enlarged fragment of said dock leveler as seen from the side thereof opposite the side shown in FIG. 5.

The rearward end of the slide bar 42 is associated with a fixed support member 47 and is operatively connected thereto by means for an intermediate one-way latch device 48. The support member 47, as illustrated in FIG. 4, is provided with a clevis-like structure adjacent its upper end which defines a pair of spaced ears or plates, and the lower end of the support member 47 is fixedly secured to the base 11. The support member 47 is also additionally rigidified by means of a brace member 49 which extends between the support member 47 and a rearward portion of the frame 11.

Considering now the one-way latch device 48, same includes a hollow mounting block 51 which, as illustrated in FIG. 4, is pivotally supported between the upwardly extending plates of the support member 47 by means of a pivot bolt 52. The bolt 52 in turn pivotally supports thereon a cam 53, which cam 53 is provided with a toothed or serrated external surface 54. The rearward end of the slide bar 42 slidably extends through the mounting block 51 and is positioned so that the bottom surface 56 thereof is normally slidably supported on the internal surface 57 of the block 51. The upper surface 58 of the slide bar 42 is disposed so as to be engaged by the toothed or serrated surface 54.

The cam 53 is provided with an elongated handle 61 fixed thereto and extending outwardly therefrom, which handle extends primarily in a horizontal direction. The free end of the handle 61 is connected to the lower end of a release member 62, which release member 62 may comprise a flexible cable, chain or the like, and is provided with a ring or other suitable gripping device 63 on its upper end. Ring 63 is disposed adjacent the surface of the deck section 12 so as to be manually accessible.

In the one-way latch device 48, the cam 53 is preferably constructed of a hardened steel, whereas the slide bar 42 is preferably constructed from a soft mild steel so that the teeth 54 will thus be able to bite firmly into the bar 42 so as to rigidly lock same in the desired position to prevent undesired upward movement of the deck section 12 due to the resilient urging of the lifting mechanism 14. Further, as illustrated in FIG. 3, the toothed surface 54 is eccentric relative to the pivot axis defined by the bolt 52. That is, the toothed surface 54 is generated similar to a cam or sloped wedge surface since the teeth adjacent the rightward end of the surface 54 are positioned more closely adjacent the axis of the bolt 52 then are the teeth adjacent the leftward end of the surface 54. The radial spacing of the teeth 54 from the axis of the bolt 52 progressively increases as the toothed surface is generated from the rightward to the left end thereof as illustrated in FIG. 3.

OPERATION

The operation of the present invention will be understood from the foregoing description. However, said operation will be briefly summarized hereinafter for convenience.

With the leveler 10 in its normal storage position, the deck or ramp 12 will be held in its horizontal cross-traffic position so that lift trucks and other equipment can be safely moved thereacross along the dock. When the dockboard is to be utilized in association with the bed of a carrier, a lock (not shown) is manually released, whereby the dockboard is in a condition to permit utilization of same. However, the deck will remain in its horizontal cross-traffic position by means of the one-way latch device 48.

Reference is made specifically to FIGS. 2-4 for the manner in which the latch device 48 operates. When the deck is in the horizontal position, illustrated by solid lines in FIG. 2, the springs 16 associated with the lift mechanism 14 normally urge the lift arm 23 in a clockwise direction about the pivot 24. This thus tends to urge the deck 12 upwardly toward the broken line position illustration in FIG. 2. However, any tendency for the lift arm 23 to swing upwadly also tends to push the slide bar 42 rearwardly through the mounting block 51. With the cam 53 positioned as illustrated in FIG. 3, so that the arm 61 extends substantially horizontally, the weight of the arm 61 urges the cam 53 in a counterclockwise direction so that the serrated wedgelike surface 54 is wedged into tight gripping engagement with the upper surface 58 of the slide bar 42. This gripping engagement occurs not only due to the wedgelike profile of the surface 54, but also due to the provision of the teeth which grip the metal of the slide bar 42.

Any tendency of the lift arm 23 to move upwardly causes a corresponding rearward movement (rightward movement in FIG. 3) of the slide bar 42, which cause the cam 53 to become wedged more tightly into engagement with the upper surface 58. Thus, the slide bar 42 becomes tightly wedged between the cam 53 and the bottom internal surface 57 of the mounting block 51. The slide bar 42 is thus effectively prevented from moving rearwardly (rightwardly in FIGS. 2 and 3), so that the springs 16 are thus prevented from raising the deck 12.

According, when it is desired to raise the deck, the ring 63 is manually gripped and the release chain 62 is thereby pulled so as to swing the cam 53 upwardly (clockwise in FIG. 3), which thus moves the wedging surface 54 out of gripping engagement with the upper surface 58 of the slide bar 42. The slide bar 42 is thus effectively released, whereupon the springs 16 cause the arm 23 to swing upwardly so as to move the deck into the raised position illustrated by broken lines in FIG. 2. As the deck is moving upwardly, the handle 61 of the cam 53 will be maintained in an upper release position by the release chain 62, thereby permitting the slide bar 42 to move rearwardly (rightwardly in FIG. 3) through the mounting block 51. During upward movement of the deck section, the lip plate 28 will also be extended so as to be substantially flush with the deck 12 when said deck reaches its raised position. When the deck reaches its upper position, the operator will then manually release the chain 62 so as to enable the cam 53 to swing, by gravity, back to its lowered position, as illustrated in FIG. 3, thereby reactivating the one-way latch device 48 associated with the hold-down mechanism 41.

To position the dockboard relative to the bed of a carrier, the operator will then walk out from the rearward to the forward edge of the deck 12, which causes the deck 12 to swing downwardly until the lip plate 28 rests on the bed of the carrier substantially as illustrated by broken lines in FIG. 2. During this downward swinging movement of the deck, the lift arm 23 is also swung downwardly (counterclockwise in FIG. 2) thereby causing the slide bar 42 to be pulled forwardly through the moutning block 51, which movement is freely permitted inasmuch as the toothed cam profile 54 will not grippingly engage the surface 58 during forward movement of the slide bar 42. The one-way latch device 48 thus permits free forward movement of the slide bar 42 as required so as to permit free downward swinging movement of the deck section 12.

With the lip 28 positioned in engagement with the bed of the carrier, the operator standing on the deck can then move off the deck, whereupon the deck will be held in engagement with the bed due to the one-way latch device 48, which latch device again causes a gripping engagement between the cam surface 54 and the slide bar 42 so as to prevent the deck from being moved upwardly due to the urging of the springs 16. The dockboard is thus positioned so as to enabled the bed of the carrier to be loaded or unloaded. If the bed of the carrier is being loaded, then the elevation of the bed will slowly decrease as the load thereon increases, which in turn causes the deck 12 to slowly swing downwardly to accomodate the new lowered elevation of the bed. This lowering of the deck section 12 is freely permitted by the hold-down device 41 since the one-way latch device 48 does not restrict downward swinging movement of the deck section.

However, if the bed of the carrier is being unloaded, then the elevation of the bed will gradually rise as the load on the carrier is relieved. As the height of the bed increases, it will also cause the deck 12 to be slowly swung upwardly. As this upward movement of the deck 12 occurs, as due to the removal of the load from the bed, the hold-down device 41 remains rigidly locked due to the gripping engagement between the cam 53 and the slide bar 42. However, since the slide bar 42 is pivotally supported at its rearward end by the mounting block 51 and is pivotally connected at its forward end to the clevis 44, the lift arm roller 26 will thus follow the profile of the cam 27 as the deck section 12 is lifted upwardly by the carrier bed. This thus results in a slight upward pivoting of the lift arm 23 about the pivot 24, which in turn causes a relative pivoting between the springs 16 and the adjustment rod 19 so that they assume an angular relationship with respect to one another substantially as illustrated in FIG. 5.

Thus, the hold-down device 41 of the present invention enables the lift arm to move upwardly and remain in engagement with the deck as same is lifted by the bed of the truck. However, this upward movement of the lift arm is compensated for by a relative pivotal movement which occurs between the springs 16 and the adjustment rod 18 since the hold-down device 41 remains rigid due to the locked relationship which exists with respect to the slide bar 42. The extension springs 16 thus stay under load, whereas the relative pivotal movement which occurs between the springs 16 and rod 18 enables the roller 26 to remain in engagement with the cam 27 so as to partially cushion the fall of the deck 12 when the truck bed is removed from beneath the lip plate 28.

The hold-down device of the present invention, as explained above, thus permits downward movement of the deck while effectively preventing upward movement of the deck due to the resilient urging of the lift arm mechanism. At the same time, the hold-down mechanism coacts with the resilient lift arm mechanism in a manner which enables limited upward movement of the deck, such as is caused when the load is removed from the carrier bed. Further, limited upward movement of the deck is permitted while at the same time the present invention utilizes a completely rigid hold-down device which is totally free of springs or other resilient devices.

The hold-down device of the present invention is highly desirable since, as explained above, it does not rely upon any springs for activation thereof. The deck is thus resiliently urged solely by means of the springs associated with the lifting mechanism. In this manner, positioning of the deck in its normal storage position can be achieved more accurately and more efficiently.

Further, the present invention does not rely upon pawls, gear racks or other expensive devices for creating a one-way latching engagement, which devices are not only expensive to fabricate, but are also extremely expensive to maintain. Rather, the present invention relys fully on a wedge-type engagement between a cam and a slide bore which wedge type engagement is further assisted by providing a cam of hardened steel having a serrated or toothed profile adapted for engagement with a slide bar which is preferably constructed of a soft steel to facilitate a desirable gripping engagement therebetween. Further, if the upper surface of the slide bar 42 becomes worn from constant clamping at the dock level position, then the slide bar 42 can be longitudinally shifted merely by inserting the pivot or hinge pin 43 through one of the other holes 46, thereby causing the slide bar 42 to be positioned so as to have a new area of its upper surface position for engagement with the cam 53.

While the present invention uses a toothed surface 54 on the cam 53, the surface 54 can be replaced by a conventional wedge surface constructed of conventional brake lining material, if desired.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privelege is claimed are defined as follows:

1. In an adjustable dock leveler, the combination including:
   a stationary mounting structure;
   a ramp hingedly mounted on said stationary mounting structure for swinging movement about a substantially horizontal axis;
   ramp lifting means coacting between said ramp and said mounting structure for substantially continuously urging said ramp to swing upwardly about said horizontal axis;
   said ramp lifting means including a lifting arm pivotally supported on said support structure for swinging movement about a substantially horizontal pivot axis, said lifting arm including means thereon coacting with said ramp for swinging said ramp upwardly in response to swinging movement of said lifting arm about its pivot axis;
   said lifting means further including resilient link means connected between said support structure and said lifting arm for continuously urging said lifting arm to swing in a direction for causing upward swinging movement of said ramp, said resilient link means being hingedly connected to said lifting arm; and
   releasable holding means coacting between said ramp lifting means and said support structure and acting in oppostion to said ramp lifing means for restraining same, comprising the improvement wherein said releasable holding means is connected directly to said resilient link means for restraining same when said holding means is in a latched position while permitting pivotal movement between said lifting arm and said resilient link means to enable said lifting arm to follow the upward swinging movement of said ramp as caused by application of an external force to said ramp.

2. A dock leveler according to claim 1, wherein said resilient link means includes elongated rigid rod means and extension spring means hingedly connected in series with one another, the free end of said rod means being hingedly connected to one of said lifting arm and said support structure, and the free end of said spring means being hingedly connected to the other of said lifting arm and support structure, said spring means and said rod means being disposed with their longitudinal axes substantially parallel to one another when said holding means is in a released position, and said holding means being pivotally connected at one end thereof to said support structure and being pivotally connected at the other end thereof to one of said rod means and said spring means.

3. A dock leveler according to claim 2, wherein said rod means is hingedly connected to said lifting arm and wherein said spring means is hingedly connected to said support structure, and said holding means being hingedly connected to said resilient link means in the vicinity of the pivotal connection between said rod means and said spring means.

4. A dock leveler according to claim 2, wherein said holding means includes an elongated rigid rod member disposed with the longitudinal direction thereof extending substantially parallel to the longitudinal axis of said spring means when said holding means is in said released position, said holding means including first pivot means hingedly connecting said rod member adjacent one end thereof to said resilient link means, said holding means further including second hinge means adjacent the other end of said rod member and hingedly connecting same to said support structure, the holding means further including one-way latching means associated with one of said first and second hinge means for permitting free slidable movement of said rod member substantially in the longitudinal direction thereof when said ramp and said lifting arm are being swung downwardly, said one-way latching means preventing slidable movement of said rod member in the opposite direction for normally restraining upward swinging movement of said lifting arm.

5. A dock leveler according to claim 4, wherein said one-way latching means includes a rotatable cam member normally urged into wedging and locking engagement with said rod member for preventing slidable movement of said rod member in said opposite direction, and manual release means connected to said rotatable cam member for permitting same to be manually rotated into a release position for permitting free slidable movement of said rod member in either direction.

6. A dock leveler according to claim 5, wherein said cam is constructed of hardened steel and is provided with a serrated wedgelike gripping surface thereon, and wherein said rod member is of a soft metal adapted to be bitingly gripped by the serrated surface.

7. A dock leveler according to claim 5, wherein said one-way latching means is associated with said second hinge means and includes a yoke member swingably supported on said support structure for swinging movement about a substantially horizontal pivot axis, said rod member being slidably confined and guided by said yoke member for slidable movement within a plane which is substantially perpendicular to said pivot axis, and a locking cam mounted for rotation about said pivot axis and having a wedgelike camming surface disposed for wedging engagement with said rod member for wedgingly locking said rod member between said cam and said yoke member.

8. A dock leveler according to claim 7, wherein said cam is provided with a serrated camming surface adapted to wedingly and grippingly engage said rod member, and wherein said cam includes an elongated handle projecting therefrom in a substantially horizontal direction, the weight of said handle normally urging said cam into wedging and locking engagement with said rod member.

9. In a dock leveler having a support structure, a ramp hingedly mounted on said support structure for swinging movement about a substantially horizontal axis, a lifting mechanism coacting between said ramp and said support structure for normally urging said ramp to swing upwardly about said axis, and a holddown mechanism hingedly connected at one end thereof directly to said support structure and hingedly connected at the other end thereof directly to said lifting mechanism for normally restraining movement of said lifting mechanism in a direction causing upward swinging movement of said ramp, comprising the improvement wherein said hold-down mechanism includes first and second rigid members having coacting portions directly slidably supporting one another for permitting relative slidable movement therebetween, one of said first and second rigid members being hingedly connected directly to said support structure, the other of said first and second rigid members being hingedly connected directly to said lifing mechanism, and a one-way latch device operatively associated with coacting portions of said first and second rigid members for preventing relative slidable movement of said first rigid member in one direction when said latch means is in a latching position while permitting free relative slidable movement of said first member relative to said second member in the opposite direction when said latch device is in said latching position, said one-way latch device including a cam pivotally mounted on said second rigid member for swinging movement about a pivot axis, said cam having a camming surface which is eccentric relative to said pivot axis, said second rigid member being hingedly connected for swinging movement about an axis which is substantially coaxially aligned with the pivot axis of said cam, and said first rigid member including a rodlike portion positioned for engagement by the camming surface of said cam.

10. A dock leveler according to claim 9, wherein said second rigid member comprising a yokelike member hingedly supported directly on said support structure for swinging movement relative thereto about a substantially horizontal axis, said cam being disposed within said yoke member and rotatable relative to said yoke member about said horizontal axis, and said first rigid member coomprising an elongated rodlike ele ment having one end thereof slidably supported within said yoke member, the other end of said rodlike element pivotally connected to said lifting means.

11. In a dock leveler having a frame structure and a ramp structure pivotally mounted on said frame structure for swinging movement relative thereto, comprising in combination:
lift arm means coacting between said frame structure and said ramp structure for causing relative swinging movement therebetween, said lift arm means being pivotally connected to one of said structrures, and a lost motion coupling means coacting between said lift arm means and the other of said structures;
extendable and contractable power means connected between said lift arm means and a first one of said structures for causing swinging movement of said lift arm means in a direction for causing raising of said ramp structure;
elongated rigid link means pivotally connected between said lift arm means and said power means for transmitting force between said power means and said lift arm means; and
one-way latch means coacting with said extendable and contractablepower means for normally maintaining same substantially at a preset position for preventing movement of said lift arm means in a direction for causing raising of said ramp structure, said one-way latch means permitting unrestricted movement of said power means and of said lift arm means in the opposite direction for lowering said ramp structure, said one-way latch means including elongated linkage means connected adjacent one end thereof to the first one of said structures, and said elongated linkage means being pivotally connected adjacent the other end thereof to one of said power means and said link means.

12. A dock leveler according to claim 11, wherein said other end of said linkage means is pivotally connected to one of said power means and said link means in the vicinity of the pivotal connection therebetween.

13. A dock leveler according to claim 12, wherein said linkage means includes an elongated slide rod having the opposite ends thereof pivotally supported, and a one-way latch device associated with the pivotal support associated with one end of said slide rod for permitting slidable movement of said slide rod in the longitudinal direction thereof while enabling locking of said slide rod ina selected position for preventing slidable movement thereof in one direction for preventing slidable movement thereof in one direction for preventing movement of said power means in a direction tending to cause lifting of said ramp structure.

14. In a dock leveler having a support structure, a ramp structure hingedly mounted on said support structure for swinging movement about a substantially horizontal axis, a lifting mechanism coacting between said ramp structure and said support structure for normally urging said ramp structure to swing upwardly about said axis, said lifting mechanism including an elongated lifting arm hingedly connected to one of said structures for swinging movement about a substantially horizontal hinge axis, said lifting mechanism also including extension spring means connected at one end thereof to said support structure and elongated rigid rod means connected between said lifting arm and the other end of said spring means for normally urging said lifting arm in a direction for causing upward swinging movement of said ramp structure, said rod means and said spring means normally being substantially coaxially aligned and having a pivotal connection between the adjacent ends thereof, and a hold-down mechanism hingedly connected at one end thereof directly to said support structure and hingedly connected at the other end thereof directly to said lifting mechanism for normally restraining movement of said lifting mechanism in a direction causing upward swinging movement of said ramp structure, comprsiing the improvement wherein said hold-down mechanism includes first and second rigid members having coacting portions directly slidably supporting one another for permitting relative slidable movement therebetween, one of said first and second rigid members being hingedly connected directly to said support structure, the other of said first and second rigid members being hingedly connected directly to said lifting mechanism, and a one-way latch device operatively associated with coacting portions of said first and second rigid members for preventing relative slidable movement of said first rigid member in one direction when said latch means is in a latching position while permitting free relative slidable movement of said first member relative to said second member in the opposite direction when said latch device is in said latcing position, said one-way latch device including a cam pivotally mounted on said second rigid member for swinging movement about a pivot axis, said cam having a camming surface which is eccentric relative to said pivot axis, said first rigid member including a rodlike portion positioned for engagement by the camming surface of said cam, and said other of said first and second rigid members being pivotally connected to said rod means at a location spaced from the pivotal connection between said rod means and said spring means for enabling said rod means and said spring means to relatively pivot with respect to one another so as to assume an angular relationship with respect to one another when said latch means is in said latched position and an external force is imposed on said ramp tending to raise same.

15. In a dock leveler having a support structure, a ramp structure hingedly mounted on said support structure for swinging movement about a substantially horizontal axis, a lifting mechanism coacting between said structures for normally urging said ramp structure to swing upwardly about said axis, said lifting mechanism including an extendable and contractable power device having one end thereof interconnected to said support sturcture and the other end thereof interconnected to said ramp structure, said power device including spring means and elonaged rigid rod means disposed in series and having theri adjacent ends hingedly connected together, and releasable holding means coacting between said structures and acting in opposition to said lifting mechanism for normally restraining movement of said lifting mechanism in a direction causing upward swinging movement of said ramp structure, said holding means including a one-way latch device for permitting downward swinging movement of said ramp structure while restricting upward movement of said ramp structure, comprising the improvement wherein said holding means includes first and second rigid members having coacting portions movably supporting one another, said one-way latch device being operatively associated with said coacting portions for preventing relative movement therebetween in a direction tending to cause upward swinging movement of the ramp structure while permitting free relative movement therebetween in a direction permitting downward swinging movement of the ramp structure, said holding means being associated with said power device with said first rigid member being interconnected to said spring means adjacent one end thereof and said second rigid member being interconnected to said spring means adjacent the other end thereof for preventing movement of said spring means in a direction tending to cause upward swinging movement of said ramp structure when said latch device is in its latched position.

16. A dock leveler according to claim 15, wherein said lifting mechanism includes an elongated lifting arm coacting between said frame structure and said ramp structure and disposed for substantially vertical swinging movement, said lifting arm being hingedly connected to one end of said power device.

* * * * *